United States Patent
Liu et al.

(10) Patent No.: US 12,091,493 B2
(45) Date of Patent: Sep. 17, 2024

(54) POLYMERIZABLE THERMOSETTING RESINS FROM TALL OIL

(71) Applicant: INGEVITY SOUTH CAROLINA, LLC, North Charleston, SC (US)

(72) Inventors: Yongning Liu, Apex, NC (US); Mitra Ganewatta, Ladson, SC (US); Zhigang Chen, Mount Pleasant, SC (US)

(73) Assignee: INGEVITY SOUTH CAROLINA, LLC, North Charleston, SC (US)

( * ) Notice: Subject to any disclaimer, the term of this patent is extended or adjusted under 35 U.S.C. 154(b) by 0 days.

(21) Appl. No.: 17/996,763

(22) PCT Filed: Apr. 19, 2021

(86) PCT No.: PCT/US2021/027935
§ 371 (c)(1),
(2) Date: Oct. 20, 2022

(87) PCT Pub. No.: WO2021/216435
PCT Pub. Date: Oct. 28, 2021

(65) Prior Publication Data
US 2023/0174707 A1    Jun. 8, 2023

Related U.S. Application Data

(60) Provisional application No. 63/013,077, filed on Apr. 21, 2020.

(51) Int. Cl.
C08G 59/16 (2006.01)
C08G 59/17 (2006.01)

(52) U.S. Cl.
CPC ..... C08G 59/1472 (2013.01); C08G 59/1466 (2013.01)

(58) Field of Classification Search
None
See application file for complete search history.

(56) References Cited

U.S. PATENT DOCUMENTS

| | | | | |
|---|---|---|---|---|
| 5,889,076 A | * | 3/1999 | Dones | C08J 3/28 522/146 |
| 6,136,506 A | * | 10/2000 | Hashimoto | H01L 27/0922 522/100 |
| 6,211,308 B1 | * | 4/2001 | Saint Victor | D06M 14/28 442/154 |
| 2005/0250923 A1 | * | 11/2005 | Palmese | C08F 220/286 526/317.1 |

FOREIGN PATENT DOCUMENTS

| | | | | |
|---|---|---|---|---|
| CN | 108570132 A | | 9/2018 | |
| CN | 108641040 A | * | 10/2018 | |
| CZ | 145752 A | * | 10/1976 | |
| EP | 1112297 B1 | | 4/2004 | |
| EP | 1742974 B1 | | 7/2013 | |
| EP | 3842467 A1 | * | 6/2021 | ............. C08G 59/32 |
| JP | 2001261759 A | * | 9/2001 | |
| WO | WO-0138446 A1 | * | 5/2001 | .......... C08F 290/064 |
| WO | WO-2020039923 A1 | * | 2/2020 | ............. C08G 59/32 |

OTHER PUBLICATIONS

Magee et al., "Composition of American distilled tall oils," Journal of the American Oil Chemists' Society, vol. 69, pp. 321-324 (1992) (Year: 1992).*
International Search Report and Written Opinion for PCT/US2021/027935, Issued Jul. 13, 2021.
Tall Oil. Ullmann's Encyclopedia of Industrial Chemistry. vol. 35: 583-596 7th Edition (2012). Wiley-VCH (ed.).

* cited by examiner

*Primary Examiner* — Randy P Gulakowski
*Assistant Examiner* — Ha S Nguyen
(74) *Attorney, Agent, or Firm* — Bryan D. Zerhusen; Nicholas R. Herrel; CANTOR COLBURN LLP

(57) ABSTRACT

Presently described are curable compounds and curable compositions. Thermosets including the curable compounds and curable compositions described herein are derived from bio-based components and have improved mechanical properties. The described compositions can also be applicable to rosin derivatives and fatty acid derivatives.

21 Claims, No Drawings

POLYMERIZABLE THERMOSETTING RESINS FROM TALL OIL

CROSS-REFERENCE TO RELATED APPLICATION

This application is a National Stage Entry of PCT/US2021/027935, filed 19 Apr. 2021 and published as WO 2021/216435 A1, which claims the benefit of and priority to U.S. Provisional Application No. 63/013,077, filed on 21 Apr. 2020, each of which is incorporated by reference herein in its entirety.

BACKGROUND

1. Field of the Discovery

The present disclosure relates to free radical curable compositions of rosin acids, fatty acids, and derivatives thereof. In certain aspects the rosin acids, fatty acids, and derivatives thereof are derived from tall oil rosins, gum rosins or wood rosins. The disclosure also provides methods of making curable compositions and thermosetting compositions.

2. Background Information

Thermosetting compositions, such as unsaturated polyesters, vinyl esters, epoxy resins, have been widely used in in coatings, adhesives and composite materials. Historically, thermoset resins have been synthesized using petroleum-based chemicals as raw materials. However, due to increasing environmental concerns, there is a need for thermoset resins derived from bio-based feedstocks.

Bio-based feedstocks include fatty acids derived from plant-based oils including but not limited to soybean oil, canola oil, tall oil, safflower oil, linseed oil, castor oil, corn oil, sunflower oil, olive oil, sesame oil, cottonseed oil, palm-based oils, rapeseed oil, tung oil, peanut oil, jatropha oil, and combinations thereof. Other bio-based feedstocks include rosin acids including gum rosin acid, wood rosin acid, tall oil rosin acid, or a combination thereof.

Rosin, a bio-renewable raw material, is commercially available, and can be obtained from pine trees by distillation of oleoresin (gum rosin being the residue of distillation), by extraction of pine stumps (wood rosin) or by fractionation of tall oil (tall oil rosin). Rosin contains a mixture of rosin acids, fatty acids, and other unsaponifiable compounds.

Tall oil, a type of rosin (originating from the Swedish word "tallolja" ("pine oil")) is obtained as a by-product of Kraft pulping in the paper making process. A product of the Kraft process, crude tall oil (CTO), can be further purified by distillation to provide tall oil heads, tall oil fatty acids (TOFA), distilled tall oil (DTO), tall oil rosin (TOR), and tall oil pitch. These products have long been used in traditional fields such as inks, adhesives, oil fields, mining, paper sizing and detergents.

Previous attempts have been made to incorporate fatty acids into thermoset resins to improve flexibility and processability. Using fatty acids alone to modify thermoset resins may reduce mechanical strength and thermal stability. Using only rosin acid to modify thermoset resins may lead to a brittle solid or highly viscous liquid. There accordingly remains a need in the art for curable compositions derived from bio-based components that provide improved mechanical strength and thermal stability while maintaining good toughness and flexibility.

SUMMARY

Presently described are curable compounds, curable compositions, and thermoset compositions including curable compounds derived from rosin acids, fatty acids, and their derivatives thereof. The compositions comprising the curable compounds described herein surprisingly and unexpectedly provide curable compositions with a good processability and the thermoset compositions having a wide range of glass transition temperatures and improved tensile properties.

In any of the aspects or embodiments described herein, a first curable compound is disclosed comprising a reaction product of: a rosin acid or derivative thereof, a fatty acid or a derivative thereof, or a combination thereof; a glycidyl ether component comprising at least two glycidyl ether groups; an $\alpha,\beta$-unsaturated carboxylic acid; and a catalyst, wherein the curable compound has at least one terminal functional group comprising (meth)acrylate.

In any of the aspects or embodiments described herein, a method for preparing a first curable compound is disclosed comprising the steps of: reacting the rosin acid or derivative thereof and/or the fatty acid or a derivative thereof with a glycidyl ether component in the presence of a catalyst to provide the ring-opened first intermediate; and reacting the ring-opened first intermediate with an $\alpha,\beta$-unsaturated carboxylic acid in the presence of catalyst to provide the first curable compound.

In any of the aspects or embodiments described herein, a curable composition is disclosed comprising at least one first curable compound; a second curable compound comprising a reaction product of a rosin acid or derivative thereof, a fatty acid or a derivative thereof, or a combination thereof, a glycidyl ester of an $\alpha,\beta$-unsaturated acid, and a catalyst, wherein the second curable compound has at least one terminal functional group comprising (meth)acrylate; a curable resin; a catalyst; a free radical curing initiator; and a curing agent.

In any of the aspects or embodiments described herein, a thermoset comprising the curable composition is disclosed having a glass transition temperature ranging from 70 to 120° C. as determined using dynamic mechanical analysis.

The preceding general areas of utility are given by way of example only and are not intended to be limiting on the scope of the present disclosure and appended claims. Additional objects and advantages associated with the compositions, methods, and processes of the present disclosure will be appreciated by one of ordinary skill in the art in light of the instant claims, description, and examples. For example, the various aspects and embodiments of the present disclosure can be utilized in numerous combinations, all of which are expressly contemplated by the present disclosure. These additional advantages objects and embodiments are expressly included within the scope of the present disclosure. The publications and other materials used herein to illuminate the background of the invention, and in particular cases, to provide additional details respecting the practice, are incorporated by reference.

DETAILED DESCRIPTION

The present disclosure will now be described more fully hereinafter, but not all embodiments of the disclosure are shown. While the disclosure has been described with reference to exemplary embodiments, it will be understood by those skilled in the art that various changes can be made and equivalents can be substituted for elements thereof without departing from the scope of the disclosure. In addition, many modifications can be made to adapt a particular structure or material to the teachings of the disclosure without departing from the essential scope thereof.

Where a range of values is provided, it is understood that each intervening value between the upper and lower limit of that range and any other stated or intervening value in that stated range is encompassed within the invention. The upper and lower limits of these smaller ranges can independently be included in the smaller ranges is also encompassed within the invention, subject to any specifically excluded limit in the stated range. Where the stated range includes one or both of the limits, ranges excluding either both of those included limits are also included in the present disclosure.

The following terms are used to describe the present invention. In instances where a term is not specifically defined herein, that term is given an art-recognized meaning by those of ordinary skill applying that term in context to its use in describing the present invention.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the 10 United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a nonlimiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc. It should also be understood that, unless clearly indicated to the contrary, in any methods claimed herein that include more than one step or act, the order of the steps or acts of the method is not necessarily limited to the order in which the steps or acts of the method are recited.

Exemplary Aspects and Embodiments

Surprisingly and unexpectedly, the inventors discovered that curable compositions derived from bio-based feedstocks can have desirable properties for various applications. These curable compositions can include the first curable compound, a second curable compound, or a combination thereof; a curable resin; a free radical initiator; and optionally, a curing accelerator. The first curable compound comprises a reaction product of rosin acids, fatty acids, or derivatives thereof; a glycidyl ether component; an $\alpha,\beta$-unsaturated carboxylic acid; and a catalyst to provide a first curable compound having a terminal functional group. The second curable compound includes a reaction product of rosin acids, fatty acids, or derivatives thereof; a glycidyl ester of an $\alpha,\beta$-unsaturated carboxylic acid; and a catalyst, wherein the second curable compound has a terminal functional group. The curable resin includes a reaction product of a glycidyl ether component and an $\alpha,\beta$-unsaturated carboxylic acid, wherein the curable resin has a at least one terminal functional group. Each of the first curable compound, the second curable compound and the curable resin have terminal functional groups. In the presence of a free radical curing initiator, the terminal functional groups can undergo polymerization and cross-linking and to provide a thermoset. Advantageously, the thermosets are bio-based materials and have comparable properties to petroleum-based thermosets.

The disclosed methods relate to curable compounds from rosin acids, fatty acids, and derivatives thereof; methods for preparing the curable compounds; curable compositions from the curable compounds and resins; method for preparing the curable compositions; thermoset compositions including the curable compositions; the method of making the thermoset compositions; and products derived from derivatives of the thermoset compositions.

As described above, prior curable compositions derived from bio-based feedstocks suffer from well-known disadvantages including brittleness and poor mechanical properties.

Thus, in an aspect, the description provides a first curable compound comprising: a reaction product of a rosin acid or derivative thereof, a fatty acid or a derivative thereof, or a combination thereof, a glycidyl ether component comprising at least two glycidyl ether groups, an α,β-unsaturated carboxylic acid, and a catalyst, wherein the curable compound has at least one terminal functional group comprising (meth)acrylate.

In an aspect, the description provides a curable composition comprising a first curable compound; a second curable compound comprising a reaction product of a rosin acid or derivative thereof, a fatty acid or a derivative thereof, or a combination thereof, a glycidyl ester of an α,β-unsaturated carboxylic acid, and a catalyst, wherein the second curable compound has at least one terminal functional group comprising (meth)acrylate, or a combination thereof; a free radical curing initiator; and optionally, a curing accelerator.

In any of the aspects or embodiments described herein, the curable compound and the curable compositions include rosin acids, or derivatives thereof, fatty acids, or derivatives thereof, or a combination thereof.

Rosin acids include $C_{20}$ mono-carboxylic acids with a core having a fused carbocyclic ring system comprising double bonds that vary in number and location. Examples of rosin acids include abietic acid, neoabietic acid, pimaric acid, levopimaric acid, sandaracopimaric acid, isopimaric acid, and palustric acid. TOR can further contain dimerized rosin acids and dehydroabietic acids formed during the Kraft process and distillation of CTO.

TOFA includes a complex mixture of fatty acids, including, e.g., palmitic, stearic, oleic, elaidic, and linoleic acids.

The disclosed curable compounds and compositions can include rosin acid derivatives and/or fatty acid derivatives. Rosin acid derivatives and fatty acid derivatives can include Diels-Alder adducts. Diels-Alder cycloaddition can be used to form what are commonly called "rosin adducts" from rosin acids and "fatty acid adducts" from fatty acids. Diels-Alder adduction occurs with s-cis conjugated double bonds, or double bonds capable achieving a conjugated s-cis configuration. For example, abietic-type rosin acids undergo Diels-Alder adduction. Among the fatty acids present in tall oil products, oleic acid, linoleic acid, linolenic acid have double bonds capable of undergoing an ene reaction (as is the case for oleic acid because it has a single double bond) or Diels-Alder cycloaddition (for linoleic acid and linolenic acid).

Non-limiting exemplary dienophiles that can be used to react with conjugated dienes include maleic anhydride, fumaric acid, acrylonitrile, itaconic anhydride, and acrylic acid. Diels-Alder products obtained from the reaction of maleic anhydride with a rosin acid or a fatty acid have three carboxylic acid groups and are referred to as "maleated rosin" and "maleated fatty acid," respectively. Similarly, Diels-Alder products obtained from the reaction of fumaric acid with a rosin acid or a fatty acid have three carboxylic acid groups and are referred to as "fumarated rosin" and "fumarated fatty acid," respectively. The molar amount of dienophile (e.g., fumaric acid) used in the Diels Alder reaction can range from about 1 to about 40 mol %, 1 to about 30 mol %, about 5 to about 25 mol %, or about 10 to about 25 mol %, each based on the total moles of acid in the diene (e.g., rosin acids+fatty acids in DTO).

Rosin acid derivatives and fatty acid derivatives include dimers. The double bonds of rosin acids can react with each other to form rosin dimers. Similarly, the double bonds of fatty acids can react with each other to form fatty acid dimers. Rosin dimer molecule is a $C_{40}$-terpene typically having two double bonds and two carboxylic acid groups. Rosin dimerization can be controlled to obtain appropriate levels of dimerization; hence the dimer rosin product may be a mixture of rosin and dimerized-rosin molecules.

Rosin acid derivatives include hydrogenation products. Because the unsaturated double bonds of rosin acids are prone to oxidation and cause discoloration of a product, it may be desirable to reduce the probability of oxidation by reducing the number of double bonds in a rosin acid. Rosin acids can be partially hydrogenated to saturate one of the double bonds of the rosin acid or fully hydrogenated to saturate both double bonds.

Rosin acid derivatives and fatty acid derivatives include dehydrogenation products, also referred to as disproportionation products. For example, this process can be used to reduce the conjugated double bonds in some rosin acids, making the resulting disproportionated rosin less susceptible to oxidation. The reaction takes places between the dienes of two identical rosin acids, where one is hydrogenated and the other is dehydrogenated, thus altering the ratios of the rosin acids from the untreated rosin. Similarly, fatty acid derivatives can include disproportionation products (e.g., oleic acid).

Derivatives of rosin acids and fatty acids include carboxylic acid salts. Salts include salts of rosin acids or fatty acids having monovalent cations ("soaps") and salts of rosin acids having divalent cations ("rosinates").

Derivatives of rosin acids and fatty acids include oxidized rosin acids and oxidized fatty acids. The double bonds of rosin acids and fatty acids are prone to isomerization and oxidation when exposed to heat, air, light, and mineral acids thus providing a mixture oxidation products.

In some embodiments, the rosin acid derivatives include a disproportionated rosin, a maleated rosin, a fumarated rosin, an acrylonitrile adduct, itaconic acid adduct, an acrylic acid adduct, a dimer acid, an oxidized rosin, a hydrogenated rosin, or a combination thereof.

In some embodiments, the fatty acid derivatives include a maleated fatty acid, an acrylonitrile fatty acid adduct, a fumarated fatty acid adduct, acrylic-acid fatty acid adduct, an itaconic acid fatty acid adduct, a dimer fatty acid, an oxidized fatty acid, a hydrogenated rosin acid, or a combination thereof.

The curable compounds and compositions can be derived from bio-based components such as wood rosin, gum rosin, tall oil rosin, or natural oils. In some embodiments, the fatty acid is derived from at least one of a natural oil, crude tall oil, tall oil fatty acid, distilled tall oil, coconut oil, palm oil, rosin, tall oil rosin, gum tree rosin, wood rosin, softwood rosin, hardwood rosin, derivatives thereof, a natural oil, or a combination thereof. Non-limiting exemplary natural oils include vegetable oil, safflower oil, sesame oil, canola oil, olive oil, oil, coconut oil, soybean oil, linseed oil, castor oil, corn oil, sunflower oil, cottonseed oil, palm-based oils, rapeseed oil, tung oil, peanut oil, and jatropha oil. In some embodiments, the rosin acid is derived from crude tall oil, rosin, tall oil rosin, gum tree rosin, wood rosin, softwood rosin, hardwood rosin, distilled tall oil, derivatives thereof, or a combination thereof.

The curable compounds and compositions can include a combination of rosin acids or derivatives thereof and fatty acids or derivatives thereof. For example, one skilled in the art appreciates that commercial tall oil fatty acids (TOFA) contains some rosin acids, and commercial tall oil rosin (TOR) also contains various levels of fatty acids. In such embodiments, the curable compounds are derived from crude tall oil, tall oil fatty acid, distilled tall oil, tall oil rosin, gum tree rosin, wood rosin, softwood rosin, hardwood rosin, a natural oil, or a combination thereof. The natural oil can include vegetable oil, safflower oil, sesame oil, canola oil, olive oil, oil, coconut oil, soybean oil, linseed oil, castor oil, corn oil, sunflower oil, cottonseed oil, palm-based oils, rapeseed oil, tung oil, peanut oil, jatropha oil, or a combination thereof.

Bio-based components, which include fatty acids and rosin acids, can have a variable rosin acid content. The rosin acids and fatty acids can be present in the bio-based component from about 1 wt % to about 99 wt %, about 10 wt % to about 90 wt %, about 20 wt % to about 70 wt %, about 28 wt % to about 70 wt %, about 30 wt % to about 70 wt %, about 35 wt % to about 70 wt %, 40 wt % to about 70 wt %, about 45 wt % to about 70 wt %, or about 50 wt % to about 70 wt %, each based on the total weight of bio-based component. The bio-based component can be a distilled tall oil. Commercially available DTOs with variable rosin acid content include ALTAPYNE 226 (20 wt % rosin acid), ALTAPYNE 28B (28 wt % rosin acid), ALTAPYNE M50 (50 wt % rosin acid), and ALTAPYNE M70 (70 wt % rosin acid), all from INGEVITY.

The first curable compound includes a reaction product of a rosin acid or derivative thereof, a fatty acid or a derivative thereof, or a combination thereof, a glycidyl ether component comprising at least two glycidyl ether groups, an α,β-unsaturated carboxylic acid, and a catalyst, wherein the curable compound has at least one terminal functional group comprising (meth)acrylate.

The glycidyl ether component can include glycidyl ether resin, a glycidyl ether compound, or a combination thereof. As used herein, a "glycidyl ether resin" is an oligomer or a polymer including a glycidyl ether compound and a "glycidyl ether compound" is a monomer. Examples of glycidyl ether compounds include bisphenol A epoxy resin. The glycidyl ether component comprises at least two epoxide groups. As such, the glycidyl ether component can be a diglycidyl ether, a triglycidyl ether, a tetraglycidyl ether, and the like.

The glycidyl ether component can include a bisphenol epoxy resin, a novolac epoxy resin, a diglycidyl ether, triglycidyl ether, tetraglycidyl ether, or a combination thereof. Bisphenol epoxy resins can be obtained from the reaction of a bisphenol with epichlorohydrin. The bisphenol epoxy resins can include bisphenol A epoxy resin, bisphenol F epoxy resin, or a combination thereof. The bisphenol epoxy resins can be liquid epoxy resins and have an epoxide equivalent weight of about 150 to about 200, or about 160 to about 200, or about 170 to about 200, or about 180 to about 200 grams per equivalent as determined according to ASTM D1652. A preferred bisphenol epoxy resin is bisphenol A epoxy resin, commercially available as EPON 828; from Hexion, having an epoxide equivalent weight of about 185 to about 192 grams per equivalent. Novolac epoxy resins are the reaction products of a phenolic compound such as phenol, o-, m-, or p-cresol, or a combination of these with an aldehyde, such as formaldehyde, benzaldehyde, acetaldehyde, and the like. For example, the novolac epoxy resin can be a phenol-formaldehyde copolymer, wherein the phenolic ring is substituted with a glycidyl ether group. The novolac epoxy can have an average epoxy functionality of from about 2 to about 6, from about 3 to about 6, from about 3 to about 5, or from about 3 to about 4. Such resins also have an epoxide equivalent weight as measured by ASTM D 1652 of about 150 to about 200, or about 160 to about 190, or about 170 to about 190, or about 170 to about 185 grams per equivalent. A preferred novolac epoxy resin is D.E.N. 438, from Olin, having an epoxide equivalent weight of about 176 to about 181 grams per equivalent.

In some embodiments, the glycidyl ether component includes a glycidyl ether compound such as a diglycidyl ether, triglycidyl ether, tetraglycidyl ether, or a combination thereof. Non-limiting examples of the diglycidyl ethers include a diglycidyl ether of neopentyl glycol, a diglycidyl ether of 1,4-butanediol, and a diglycidyl ether of resorcinol. The triglycidyl ether can include trimethylolpropane triglycidyl ether and the tetraglycidyl ether can include pentaerythritol tetraglycidyl ether.

The first curable compound can be prepared by a method comprising the steps of: reacting the rosin acid or derivative thereof and/or the fatty acid or a derivative thereof with a glycidyl ether component in the presence of a catalyst to provide the ring-opened first intermediate; and reacting the ring-opened first intermediate with an α,β-unsaturated carboxylic acid in the presence of catalyst to provide the first curable compound. The molar ratio of rosin acid or derivative thereof and/or the fatty acid or a derivative thereof to the glycidyl ether component to the α,β-unsaturated carboxylic acid in the reaction can be from about 0.5:1:1 to about 1.5:1:1, more preferably from about 0.9:1:1 to about 1.1:1:1. As shown below, in an exemplary embodiment, the carboxylic acid of the rosin acid or derivative thereof and/or the fatty acid or a derivative thereof can attack a glycidyl ether of the glycidyl ether component (e.g., BPA-diglycidyl ether) to provide a ring-opened first intermediate, that can then undergo a reaction with (meth)acrylic acid to provide the first curable compound.

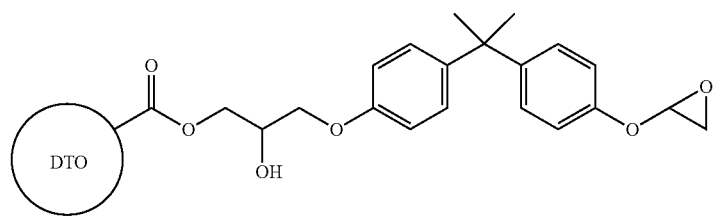

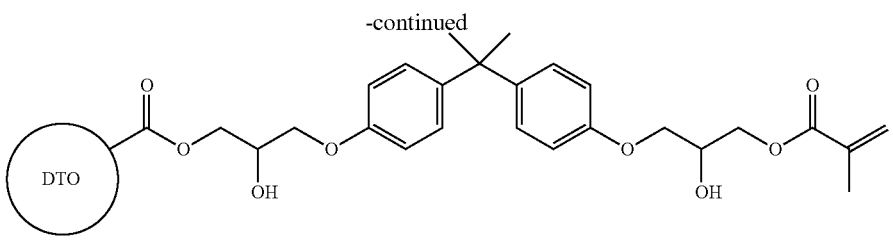

A catalyst is present in the disclosed methods. The catalyst can include imidazole, amines, organophosphine, urea derivatives and Lewis bases and their organic salts. Specifically, the catalyst can include trialkyl phosphines and triaryl phosphines, such as triphenyl phosphine.

The ring-opening reaction of the epoxide ring of the glycidyl ether component with the carboxylic acid of the rosin acids, fatty acids or derivatives thereof to form the ring-opened intermediate of the first curable compound can be performed at a temperature from about 80 to about 160° C., preferably from about 100 to about 145° C. The reaction of the ring-opened intermediate of the first curable compound with an α,β-unsaturated acid can be performed at a temperature of from about 80 to about 115° C., preferably from about 100 to about 110° C.

The curable compositions can include a second curable compound. The second curable compound includes a reaction product of a rosin acid or derivative thereof, a fatty acid or a derivative thereof, or a combination thereof, a glycidyl ester of an α,β-unsaturated acid, optionally, a diisocyanate compound, and a catalyst, wherein the second curable compound has at least one terminal functional group comprising (meth)acrylate.

The second curable compound can be prepared using a method comprising the steps of: reacting the rosin acid or derivative thereof and/or the fatty acid or a derivative thereof with a glycidyl ester of an α,β-unsaturated acid in the presence or catalyst to provide the ring-opened second curable compound; and optionally reacting the ring-opened second curable compound with a diisocyanate compound in the presence of a catalyst to provide a carbamate-functionalized second curable compound. The molar ratio of rosin acid or derivative thereof and/or the fatty acid or a derivative thereof to the glycidyl ester of the α,β-unsaturated acid in the reaction can be from about 0.5:1 to about 1.5:1, more preferably from about 0.9:1 to about 1.1:1. As shown below, in an exemplary embodiment, the carboxylic acid of the rosin acid or derivative thereof and/or the fatty acid or a derivative thereof can attack a glycidyl ester of an α,β-unsaturated acid (e.g., glycidyl (meth)acrylate) to provide the second curable compound.

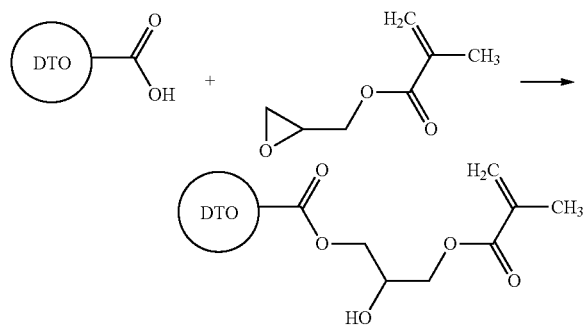

The hydroxyl group of the second curable compound can then react with a diisocyanate compound (not shown) to provide a carbamate-functionalized second curable compound.

A catalyst is present during the formation of the second curable compound of the disclosed methods. The catalyst can include imidazole, amines, organophosphine, urea derivatives and Lewis bases and their organic salts. Specifically, the catalyst can include trialkyl phosphines and triaryl phosphines, such as triphenyl phosphine. When a carbamate-functionalized second curable compound is desired, a catalyst is present. An exemplary catalyst for the reaction with the diisocyanate compound is dibutyl tin dilaurate (commercially available as T-12 catalyst).

The ring-opening reaction of the carboxylic acid with an epoxide ring to form the second curable compound can be performed at a temperature from about 80 to about 125° C., preferably from about 105 to about 115° C.

The second curable compound can undergo a further reaction with a diisocyanate compound to provide a carbamate-functionalized second curable compound. The diisocyanate compound can be a monomeric diisocyanate, an oligomeric diisocyanate, or a combination thereof. Exemplary monomeric diisocyanate compounds include: 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanatomethyl cyclopentane, 1-isocyanato-3-isocyanatomethyl-3,5,5-trimethyl-cyclohexane, bis(4-isocyanatocyclohexyl)methane, 2,4'-dicyclohexyl-methane diisocyanate, 1,3-bis(isocyanatomethyl)-cyclohexane, 1,4-bis-(isocyanatomethyl)-cyclohexane, bis(4-isocyanato methyl-cyclohexyl)methane, α,α,α',α'-tetramethyl-1,3-xylylene diisocyanate, α,α,α',α'-tetramethyl-1,4-xylylene diisocyanate, 1-isocyanato-1-methyl-4(3)-isocyanatomethyl cyclohexane, 2,4-hexahydrotoluene diisocyanate, 2,6-hexahydrotoluene diisocyanate, 1,3-phenylene diisocyanate, 1,4-phenylene diisocyanate, 2,4-toluene diisocyanate, 2,6-toluene diisocyanate, 2,4-diphenylmethane diisocyanate, 4,4'-diphenylmethane diisocyanate, 1,5-diisocyanato naphthalene, or a combination thereof. In some aspects, the diisocyanate includes 2,4'-diphenylmethane diisocyanate, 4,4'-diphenylmethane diisocyanate, toluene 2,6-diisocyanate, toluene 2,4-diisocyanate, or a combination thereof. Non-limiting examples of the oligomeric diisocyanates include tolylene diisocyanate, metaxylene diisocyanate, hexamethylene diisocyanate, and isophorone diisocyanate.

The curable compositions include a first curable compound; a second curable compound, or a combination thereof; a curable resin, a free radical initiator; and optionally, a curing accelerator. The curable resins include a reaction product of a glycidyl ether component comprising a bisphenol epoxy resin, a novolac epoxy resin, a diglycidyl ether, triglycidyl ether, tetraglycidyl ether, or a combination thereof; an α,β-unsaturated carboxylic acid; and a catalyst, wherein the curable resin has at least one terminal functional group comprising a (meth)acrylate. The ratio of the first curable compound and/or the second curable compound to the curable resin can range from about 10:90 to about 90:10, about 20:80 to about 80:20, about 25:75 to about 75:25, about 30:70 to about 70:30, about 40:60 to about 60:40, about 45:55 to about 55:45, or about 50:50.

In some embodiments, the curable composition includes a first curable compound, a curable resin, a free radical curing initiator; and optionally, a curing accelerator. In an exemplary embodiment of a curable composition, the first curable compound comprises a reaction product of a rosin acid or derivative thereof, a fatty acid or a derivative thereof, or a combination thereof, bisphenol A epoxy resin, (meth) acrylic acid, a catalyst, and optionally, a diisocyanate compound; a curable resin comprising a reaction product of bisphenol A epoxy resin and (meth)acrylic acid; a free radical curing initiator; and optionally, a curing accelerator. In another exemplary embodiment, the curable composition comprises first curable compound comprising a reaction product of a rosin acid or derivative thereof and a fatty acid or a derivative thereof each derived from distilled tall oil; bisphenol A epoxy resin; (meth)acrylic acid; a catalyst; and optionally a diisocyanate compound; a curable resin comprising a reaction product of bisphenol A epoxy resin and (meth)acrylic acid; a free radical curing initiator; and a curing accelerator.

In some embodiments, the curable composition includes a second curable compound, a curable resin, a free radical curing initiator; and a curing accelerator. The curable composition can include: a second curable compound comprising a reaction product of a rosin acid or derivative thereof, a fatty acid or a derivative thereof, or a combination thereof, a glycidyl ether of an α,β-unsaturated carboxylic acid, a catalyst, and optionally, a diisocyanate compound; a curable resin comprising a reaction product of bisphenol A epoxy resin, (meth)acrylic acid, and a catalyst; a free radical curing initiator; and optionally, a curing accelerator. In some exemplary embodiments, the curable composition includes a second curable compound comprising a reaction product of a rosin acid or derivative thereof and a fatty acid or a derivative thereof, each derived from distilled tall oil; the glycidyl ester of (meth)acrylic acid; a catalyst; and optionally, a diisocyanate compound; a curable resin comprising a reaction product of bisphenol A epoxy resin, (meth)acrylic acid, and a catalyst; a free radical curing initiator; and optionally, a curing accelerator.

In some embodiments, the curable composition includes a first curable compound, a second curable compound, a curable resin, a free radical curing initiator; and optionally, a curing accelerator. The curable composition can include: a first curable compound comprising a reaction product of a rosin acid or derivative thereof, a fatty acid or a derivative thereof, or a combination thereof, bisphenol A epoxy resin, (meth)acrylic acid, a catalyst, optionally, a diisocyanate compound; a second curable compound comprising a reaction product of a rosin acid or derivative thereof, a fatty acid or a derivative thereof, or a combination thereof, a glycidyl ester of an α,β-unsaturated carboxylic acid, a catalyst, and optionally, a diisocyanate compound; a curable resin comprising a reaction product of bisphenol A epoxy resin, (meth)acrylic acid, and a catalyst; a free radical curing initiator; and optionally, a curing accelerator.

The curable compositions include a free radical curing initiator. Exemplary free radical curing initiators include benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, α,α'-bis(t-butylperoxy-m-isopropyl) benzene, 2,5-dimethyl-2,5-di(t-butylperoxy)hexane, dicumylperoxide, di(t-butylperoxy isophthalate, t-butylperoxybenzoate, 2,2-bis(t-butylperoxy)butane, 2,2-bis(t-butylperoxy) octane, 2,5-dimethyl-2,5-di(benzoylperoxy)hexane, di(trimethylsilyl)peroxide, trimethylsilylphenyltriphenylsilyl peroxide, 2,3-dimethyl-2,3-diphenylbutane, 2,3-trimethylsilyloxy-2,3-diphenylbutane, methacryloxypropyl trimethoxysilane, ethoxylated bisphenol A di(meth)acrylate, or a combination thereof.

The curable compositions can include an accelerator. The curing accelerator can include a combination of an N-alkyl-substituted tertiary aromatic amine and a metal compound. An exemplary curing accelerator can include N, N-dimethylaniline (DMA) and a cobalt compound, such as for example, cobalt napthenate and cobalt octoate.

The curable compositions can include a polymerization inhibitor to prevent gelation during storage and transport. Examples of inhibitors can include, but are not limited to, butylated hydroxytoluene, hydroquinone, benzoquinone, phenol, and the like. The inhibitor can be used to scavenge small amounts of free radicals during storage and to improve the shelf stability of the curable compositions.

A thermoset composition (i.e., cured composition) can be obtained by either room temperature cure or elevated temperature cure. In curing, a cross-linked, three-dimensional polymer network is formed. For certain thermoset resins, for example (meth)acrylate resins, curing can also take place by irradiation with actinic radiation at a sufficient wavelength and time. In some embodiments, curing the composition can include injecting the curable composition into a mold, and curing the injected composition at room temperature or elevated temperatures in the mold.

The curing behavior of each curable composition can be characterized by room temperature gel time (RTG), cure time (RTC) and peak exotherm temperature (RTP).

The thermosets can have good tensile properties (strength, modulus, % elongation) as determined according to ASTM D638 The tensile strength of the thermoset can be from about 1500 to about 4500, about 2000 to about 4500 psi, about 2500 to about 4500 psi, about 3000 to about 4500 psi, or about 3500 to about 4500 psi. The tensile modulus can range from about 75 to about 375, about 100 to about 375, about 125 to about 375, about 150 to about 375, about 175 to about 375, about 200 to about 375, about 225 to about 375, about 250 to about 375, about 275 to about 375, or about 300 to about 375 kPsi. The % elongation can range from about 1 to about 2%, about 1 to about 1.8%, about 1 to about 1.6%, or about 1 to about 1.5%.

The glass transition temperature of the thermoset can be determined using dynamic mechanical analysis. The Tg can range from about 70 to about 120° C.

The thermosets can have decreased shrinkage. The linear shrinkage per unit length of the molded thermoset in the X-Y plane can be less than about 3%, less than about 2.5%, less than about 2%, less than about 1.5%, or less than about 1%.

The thermosets can have decreased tackiness after curing and better surface cure.

EXAMPLES

In the examples below, the acid number was measured by a Metrohm auto-titrator with KOH solution by ASTM D664.

The epoxy equivalent weight (EEW) was determined by titration with perchloric acid in acetic acid.

The details of the examples are contemplated as further embodiments of the described methods and compositions. Therefore, the details as set forth herein are hereby incorporated into the detailed description as alternative embodiments.

Example 1 (Curable Resin)

A bifunctional bisphenol A/epichlorohydrin derived liquid epoxy resin (commercially available as EPON 828 Resin from Hexion, 1026 g) and methacrylic acid (533 g) were transferred to a 3 L four-neck round bottom flask equipped with an air driven agitator, condenser, nitrogen sparge tube, and a thermocouple. The reaction mixture was charged with OH-Tempo 0.08 g and Cyanox 1790 0.80 g, blanketed with $N_2$, and heated to 95° C. Then, the catalyst triphenylphosphine (TPP, 2.00 g) was added. After the exotherm was stabilized, another 2.00 g of TPP was added. Afterwards, the temperature was raised to 105° C. When the acid number reached below 15 mg KOH/g and EEW was above 5000 g/mol, the reaction was cooled to 50° C. and 0.40 g of Ethanox 4703 was added followed by cutting the resin with the addition of 230 g of styrene. The reaction was cooled to room temperature using a water bath. The final acid number recorded was 15 mg KOH/g, EEW 9600 g/mol, viscosity @50° C. 83.0 cP.

Example 2: Methacrylated DTO Resin

ALTAPYNE DTO-MA were synthesized using different grades of INGEVITY DTO (28B, 50B, and 70) or blends of ALTAPYNE M-28 and ALTAPYNE Rosin R-24 with glycidyl methacrylate (GMA) or blends of ALTAPYNE M-28 an ALTAPYNE R-24. ALTAPYNE M-28B contains about 28% rosin acid, ALTAPYNE 50B contains about 50% rosin acid, and ALTAPYNE 70 contains about 70% rosin acid. A representative procedure is described below.

A 1 L four-neck round bottom flask equipped with an air driven agitator, condenser, nitrogen sparge tube, and a thermocouple was charged with DTO (ALTAPYNE M-28B, 500 g) along with GMA (287 g), OH-Tempo (0.04 g) and Cyanox 1790 (0.40 g). Then the reaction was commenced by stirring and heating to 95° C. Afterwards, the catalyst triphenylphosphine (TPP) 1.15 g was added. After the exotherm was stabilized, the temperature was adjusted to 105° C. and another 1.15 g of TPP was added. The temperature was then raised to 112° C. The acid number and EEW were monitored. Additional GMA (36 g) was added. The final acid number was 11 mg KOH/g, EEW 3100 g/mol, and viscosity @25° C. 265 cP.

Example 3: Multifunctional DTO-MA Resin

DTO (ALTAPYNE M-28B, 369 g) was charged into a 1 L four-neck round bottom flask equipped with an air driven agitator, condenser, nitrogen sparge tube, and a thermocouple. Fumaric acid (18.0 g) was added and the mixture was heated to 220° C. for two hours. The reaction mixture was cooled to room temperature and GMA (265 g), OH-Tempo (0.035 g) and Cyanox 1790 (0.35 g) were added. Then the reaction was commenced by stirring and heating to 95° C. TPP (1.15 g) was added. After the exotherm was stabilized, another 1.15 g of TPP was added. The temperature was maintained at 95° C. and the acid number and EEW were monitored. Additional ALTAPYNE M-28B 12 g was added to adjust the acid number. The final acid number was 6.7 mg KOH/g, EEW 3150 g/mol, and viscosity @25° C. 360 cP.

TABLE 1

Summary of methacrylated mono and multi-functional DTO product properties.

| Sample Name | DTO (wt %) | Acid Number (mg KOH/g) | EEW (g/mol) | Viscosity @ 25° C. (cP) |
|---|---|---|---|---|
| M28B-MA | 63 | 11 | 3100 | 265 |
| M50B-MA | 64 | 12 | 3300 | 410 |
| M70B-MA | 66 | 11 | 3400 | 4530 |
| M28B-F12.5-MA | 56 | 7 | 3150 | 360 |
| M50B-F20-MA | 54 | 7 | 3000 | 2090 |

Example 4: Thermosetting Resin Formulations

A typical example of preparing a cured formulation and tensile test samples can be given as follows. 60.0 g of M28B-MA and 40.0 g of curable resin (Example 1) were mixed. Afterwards, 0.1 g of 10% hydroquinone (HQ), 0.1 g of DMA and 0.1 g of $CoCl_2$ 12% were added and stirred thoroughly. Methyl ethyl ketone peroxide (MEKP, 1.25 g) was added as the initiator. After vigorous stirring, a vacuum was applied to remove air bubbles. Then, the liquid resin mixture was cast on the mold and allowed to sit overnight for room temperature curing. For the post-cure conditions, the samples were kept in a heated oven 80° C. for 1 h and 100° C. for 2 hours. The curing behavior of each formulation was characterized by room temperature gel time (RTG), cure time (RTC) and peak exotherm temperature (RTP) as summarized in Table 2. Each formulation included 100 g resin/ 0.1 g Cobalt 12%/0.1 g DMA and 1.25 g MEKP initiator.

TABLE 2

Thermosetting resin curing data.

| Sample Description (weight ratio) | Viscosity @ 25° C. (cP) | RTG (min) | RTC (min) | RTP (° C.) |
|---|---|---|---|---|
| Example 1 (100) | 7730 | 1.5 | 4.0 | 141 |
| M28B-MA (100) | 265 | 28 | 5.0 | 49 |
| M70B-MA (100) | 4530 | 105 | 30 | 35 |
| M50B-MA (100) | 410 | 42 | 7.0 | 39 |
| M28B-F12.5-MA (100) | 360 | 29 | 19 | 48 |
| M50B-F20-MA (100) | 2090 | 55 | 30 | 31 |
| M28B-MA/Example 1 (50/50) | 930 | 3.5 | 3.0 | 107 |
| M28B-MA/Example 1 (75/25) | 414 | 6.0 | 7.5 | 87 |
| M28B-MA/Example 1 (85/15) | 320 | 13 | 10 | 67 |
| M28B-MA/Example 1 (90/10) | 270 | 15 | 10 | 55 |
| M50B-MA/Example 1 (50/50) | 1410 | 5.0 | 4.0 | 116 |
| M50B-MA/Example 1 (75/25) | 682 | 9.5 | 6.0 | 88 |
| M50B-MA/Example 1 (85/15) | 590 | 22 | 11 | 68 |
| M50B-MA/Example 1 (90/10) | 510 | 22 | 9.5 | 56 |
| M70B-MA/Example 1 (50/50) | 3780 | 9.5 | 3.5 | 122 |
| M70B-MA/Example 1 (75/25) | 2910 | 14.5 | 5.5 | 86 |
| M70B-MA/Example 1 (85/15) | 3890 | 45 | 10 | 73 |
| M70B-MA/Example 1 (90/10) | 4170 | 56 | 16 | 51 |
| M28B-F12.5-MA/Example 1 (50/50) | 1410 | 4.0 | 9.0 | 111 |
| M50B-F20-MA/Example 1 (50/50) | 3680 | 4.5 | 9.5 | 81 |

TABLE 3

Thermoset resin physical properties

| Sample Description (weight ratio) | DTO (wt %) | $T_g$ (° C.) | Tensile Strength (psi) | Tensile Modulus (kpsi) | Elongation (%) | Post-cure Surface Tackiness | Shrinkage (~%) |
| --- | --- | --- | --- | --- | --- | --- | --- |
| Example 1 | 0.0 | 144.8 | 4572 | 372 | 1.27 | 4 | 3 |
| M28B-MA/Example 1 (50/50) | 31.7 | 81.2 | 2035 | 176 | 1.35 | 0 | 1.7 |
| M28B-MA/Example 1 (60/40) | 38.0 | 75.6 | 1613 | 111 | 1.83 | 0 | 0.9 |
| M28B-MA/Example 1 (75/25) | 47.5 | 61.2 | 631 | 18 | 7.20 | 0 | <0.6 |
| M50B-MA/Example 1 (50/50) | 32.2 | 94.5 | 3246 | 246 | 1.55 | 0 | 1.7 |
| M50B-MA/Example 1 (60/40) | 38.7 | 83.8 | 1533 | 169 | 1.10 | 0 | 0.9 |
| M50B-MA/Example 1 (70/30) | 45.1 | 74.5 | 599 | 91 | 0.82 | 0 | <0.6 |
| M70B-MA/Example 1 (50/50) | 33.1 | 106.7 | 3676 | 335 | 1.30 | 0 | 1.7 |
| M70B-MA/Example 1 (60/40) | 39.8 | 99.8 | 2649 | 234 | 1.28 | 0 | 0.9 |
| M70B-MA/Example 1 (70/30) | 46.4 | 91.9 | 1058 | 146 | 0.955 | 0 | <0.6 |
| M28B-F12.5-MA/Example 1 (50/50) | 28.2 | 93.8 | 3134 | 252 | 1.41 | 0 | 1.7 |
| M50B-F20-MA/Example 1 (50/50) | 27.0 | 99.2 | 4130 | 291 | 1.63 | 0 | 1.7 |

Example 5: (9269-59: Carbamate-Functionalized M50B-GMA)

600 g of M50B-GMA and 0.6 g T-12 catalyst are charged into a 2 liter reactor equipped with temperature probe, nitrogen inlet and mechanical stirrer. The reaction mixture was heated to 50° C. and then 60 g of toluene diisocyanate (TDI) are added dropwise into the reactor over 1 h maintaining the exotherm temperature below 90° C. After the exothermic peak, the reaction mixture was heated to 90-92° C. and maintained at that temperature until no N=C=O peak was found in the FT-IR spectrum at 2270 cm-1. At the end of reaction, 600 g of curable resin from Example 1 and 60 g styrene are added into the reactor. The reaction product has a viscosity 3,720 cps.

Example 6: (9269-53L)

198 g of DTO M-50B and 228 g of bisphenol A epoxy resin (trade name: EPON 828; from Hexion) were charged into a reaction vessel equipped with temperature probe, nitrogen inlet and mechanical stirrer. The reaction mixture was heated to 100° C. and then 0.8 g of TPP was charged. After the exothermic peak, the reaction mixture was cooled down to 125° C. and maintained at that temperature until an acid number≤1 and EEW=705 were reached. The reactor was cooled to 100° C. and then 107 g of EPON 828, 0.03 g OH tempo, 0.3 g Cyanox 1790, 105 g methacrylic acid were added into the reactor. The reactor was heated to 105° C. and then 1.5 g TPP was charged. After the exothermic peak, the reaction mixture was cooled down to 107° C. and maintained at that temperature until the reaction mixture had an acid number of 12, an EEW of 5906, and a viscosity @ 100C/50 RPM of 2.0 poise. 115 g of methyl methacrylate (MMA) is added into the reactor and the reactor was cooled to 30° C. and then discharged.

Example 7: (9269-54)

169 g of DTO M-28B, 129 g of bisphenol A epoxy resin (trade name: EPON 828; from Hexion), and 143 g of epoxy novolac resin (trade name: DEN 438; from Olin) were charged into a reaction vessel equipped with temperature probe, nitrogen inlet and mechanical stirrer. The reaction mixture was heated to 100° C. and then 0.8 g of TPP was charged. After the exothermic peak, the reaction mixture was cooled to 125° C. and maintained at that temperature until an acid number≤1 and EEW=470 were reached. The reactor was cooled to 100° C. and then 107 g EPON 828, 0.04 g OH tempo, 0.4 g Cyanox 1790, and 140 g methacrylic acid were added into the reactor. The reactor was heated to 105° C. and then 1.5 g TPP was charged. After the exothermic peak, the reaction mixture was cooled down to 107° C. and maintained at that temperature until the reaction mixture had an acid number of 12, an EEW of 6850, and a viscosity @100C/50 RPM of 3.9 poise. 115 g of MMA was then added into the reactor and the reactor was cooled to 30° C. and then discharged.

Example 8: (9269-55)

177 g of DTO M-50B, 129 g of bisphenol A epoxy resin (trade name: EPON 828; from Hexion), and 143 g of epoxy novolac resin (trade name: DEN 438; from Olin) were charged into a reaction vessel equipped with temperature probe, nitrogen inlet and mechanical stirrer. The reaction mixture was heated to 100° C. and then 0.8 g of TPP was charged. After the exothermic peak, the reaction mixture was cooled down to 125° C. and maintained at that temperature until an acid number≤1 and EEW=480 were reached. The reactor was cooled to 100° C. and then 107 g EPON 828, 0.04 g OH tempo, 0.4 g Cyanox 1790, 140 g methacrylic acid were added into the reactor. The reactor was heated to 105° C. and then 1.5 g TPP was charged. After the exothermic peak, the reaction mixture is cooled down to 107° C. and maintained at that temperature until the reaction mixture had an acid number of 11, an EEW of 9608, and a viscosity @100C/50 RPM of 9.8 poise. 115 g of styrene is added into the reactor and the reactor was cooled to 30° C. and then discharged.

Example 9: (9269-56)

198 g of DTO M-70B and 225 g of bisphenol A epoxy resin (trade name: EPON 828; from Hexion) were charged into a reaction vessel equipped with temperature probe, nitrogen inlet and mechanical stirrer. The reaction mixture was heated to 100° C. and then 0.8 g of TPP was charged. After the exothermic peak, the reaction mixture was cooled down to 125° C. and maintained at that temperature until an acid number of ≤1 and an EEW=666 were reached. The reactor was cooled to 100° C. and then 107 g EPON 828, 0.04 g OH tempo, 0.4 g Cyanox 1790, and 110 g methacrylic acid were added into the reactor. The reactor was heated to 105° C. and then 1.5 g TPP was charged. After the exothermic peak, the reaction mixture was cooled down to 107° C. and maintained at that temperature until the reaction mixture had an acid number of 10, an EEW of 8670, a viscosity @100C/50 RPM of 5.7 poise. 115 g of styrene was added into the reactor and the reactor was cooled to 30° C. and then discharged.

Example 10: (9269-58)

170 g of DTO M-28B and 228 g of bisphenol A epoxy resin (trade name: EPON 828; from Hexion) were charged into a reaction vessel equipped with temperature probe, nitrogen inlet and mechanical stirrer. The reaction mixture was heated to 100° C. and then 0.6 g of TPP was charged. After the exothermic peak, the reaction mixture was cooled down to 125° C. and maintained at that temperature until an acid number≤1 and EEW=543 were reached. The reactor was cooled to 80° C. and then 23 g toluene diisocyanate (TDI) and 0.2 g of dibutyl tin dilaurate (commercially available as T-12 catalyst) was added into the reactor. After the exothermic peak, the reaction mixture was heated to 90-92° C. and maintained at that temperature until no N=C=O peak was found in the FT-IR spectrum at 2270 cm$^{-1}$. 107 g EPON 828, 0.03 g OH tempo, 0.3 g Cyanox 1790, 112 g methacrylic acid were added into the reactor. The reactor was heated to 105° C. and then 1.5 g TPP was charged. After the exothermic peak, the reaction mixture was cooled down to 107° C. and maintained at that temperature until the reaction mixture had an acid number of 12, an EEW of 7970, a viscosity @ 100° C./50 RPM of 8.3 poise. 160 g of styrene is added into the reactor and the reactor was cooled to 30° C. and the discharge.

Example 11: (9269-62)

175 g of DTO M-50B and 225 g of bisphenol A epoxy resin (trade name: EPON 828; from Hexion) were charged into a reaction vessel equipped with temperature probe, nitrogen inlet and mechanical stirrer. The reaction mixture is heated to 100° C. and then 0.6 g of TPP was charged. After the exothermic peak, the reaction mixture was cooled down to 125° C. and maintained at that temperature until an acid number of ≤1 and EEW=628 were reached. The reactor was cooled to 80° C. and then 24 g toluene diisocyanate (TDI) and 0.2 g T-12 catalyst were added into the reactor. After the exothermic peak, the reaction mixture was heated to 90-92° C. and maintained at that temperature until no N=C=O peak was found in the FT-IR spectrum at 2270 cm$^{-1}$. 109 g EPON 828, 0.03 g OH tempo, 0.3 g Cyanox 1790, 112 g methacrylic acid were added into the reactor. The reactor was heated to 105° C. and then 1.5 g TPP was charged. After the exothermic peak, the reaction mixture was cooled down to 107° C. and maintained at that temperature until the reaction mixture had an acid number of 13, an EEW of 8332, and a viscosity @ 100C/50 RPM of 7.2 poise. 162 g of styrene was added into the reactor and the reactor is cooled to 30° C. and then discharged.

Example 12: (9269-63)

186 g of DTO M-28B and 236 g of bisphenol A epoxy resin (trade name: EPON 828; from Hexion) were charged into a reaction vessel equipped with temperature probe, nitrogen inlet and mechanical stirrer. The reaction mixture was heated to 100° C. and then 0.8 g of TPP was charged. After the exothermic peak, the reaction mixture was cooled down to 125° C. and maintained at that temperature until an acid number≤1 and EEW=666 were reached. The reactor was cooled to 100° C. and then 107 g of EPON 828, 0.03 g OH tempo, 0.3 g Cyanox 1790, 112 g methacrylic acid were added into the reactor. The reactor was heated to 105° C. and then 1.5 g TPP was charged. After the exothermic peak, the reaction mixture is cooled down to 107° C. and maintained at that temperature until an acid number: 14 and an EEW of 6839 were reached. 115 g of styrene was added into the reactor and the reactor is cooled to 30° C. and then discharged.

Example 13: (9269-65)

130 g of DTO M-28B and 166 g of bisphenol A epoxy resin (trade name: EPON 828; from Hexion) were charged into a reaction vessel equipped with temperature probe, nitrogen inlet and mechanical stirrer. The reaction mixture was heated to 100° C. and then 0.6 g of TPP was charged. After the exothermic peak, the reaction mixture was cooled down to 125° C. and maintained at that temperature until an acid number≤1 and EEW=666 were reached. The reactor was cooled to 100° C. and then 75 g of EPON 828, 0.02 g OH tempo, 0.2 g Cyanox 1790, and 66 g acrylic acid were added into the reactor. The reactor was heated to 105° C. and then 1.2 g TPP was charged. After the exothermic peak, the reaction mixture was cooled down to 107° C. and maintained at that temperature until an acid number of 20 and an EEW of 3540 was reached. 0.14 g toluhydroquinone (THQ) and 150 g of trimethylolpropane triacrylate (TMPTA) was added into the reactor and the reactor was cooled to 30° C. and then discharged.

Example 14: Blend Samples 9269-53B: 50/50 blend of 9269-53/Example 1

9269-54B: 50/50 blend of 9269-54/Example 1

9269-56B: 50/50 blend of 9269-56/Example 1

9269-62B: 50/50 blend of 9269-62/Example 1

Resins were fully evaluated including wet properties of viscosity, non-volatile content (NV), acid value, epoxy equivalent weight (EEW), curing, thermal and physical properties. The curing studies were measured by room temperature gel time (RTG), cure time (RTC) and peak exotherm temperature (RTP) on samples prepared from 100 g resin/0.1 g Cobalt 12%/0.1 g DMA and 1.25 g MEPK initiator. DMA Tg and tensile test samples were prepared as follows. 100 g resin/0.1 g of DMA/0.1 g of Cobalt 12% were stirred thoroughly. MEKP 1.25 g was added as the initiator. After stirring strongly vacuum was applied to remove air bubbles. Then, the liquid resin mixture was cast on the mold. It was kept overnight for room temperature curing. For the post-cure conditions, the samples were kept in a heated oven 100° C. for 2 hours. The properties are summarized in Tables 4 & 5.

TABLE 4

Summary of Resin Properties

| Produce Name | Bio-content (%) | Viscosity (cps) | Acid value | EEW | NV (%) | Reactivity: RT Gel Test | | | DMA | Physical Property | | |
|---|---|---|---|---|---|---|---|---|---|---|---|---|
| | | | | | | RTC (min) | RTC (min) | RTF (° C.) | Tg (° C.) | tensile Strength psi | tensile Modulus kpsi | Elongation % |
| 9269-53 | 31 | 2,300 | 9 | 8,816 | 83.9 | 62 | 7 | 91 | 88 | 743 | 230 | 0.4 |
| 9269-53B | 22 | 3,744 | 10 | 12,546 | 85.9 | NA | NA | NA | 100 | 2,007 | 337 | 0.7 |
| 9269-54 | 25 | 5,170 | 10.3 | 9,610 | 86.9 | 4.5 | 6.3 | 97 | 93 | 2,013 | 268 | 0.8 |
| 9269-54B | 17 | NA | NA | NA | NA | NA | A | NA | 106 | 2,312 | 315 | 0.8 |
| 9569-55 | 25 | 34,000 | 9.6 | 11,502 | 88.8 | 3.4 | 4.1 | 105 | 102 | 2,321 | 357 | 0.7 |
| 9269-56 | 31 | 9,820 | 8.4 | 12,081 | 84.9 | 7.0 | 4.4 | 113 | 93 | 1,425 | 391 | 0.4 |
| 9269-56B | 22 | NA | NA | NA | NA | 5.3 | 3.6 | 126 | 104 | 2,567 | 364 | 0.7 |
| 9269-58 | 27 | 5,010 | 9.5 | 8,274 | 80.1 | 3.0 | 6.8 | 109 | 87 | 2,364 | 212 | 1.5 |

TABLE 5

Resin Properties comparison

| Produce Name | Bio-content (%) | Viscosity (cps) | Acid value | EEW | NV (%) | Reactivity: RT Gel Test | | | DMA | Physical Property | | |
|---|---|---|---|---|---|---|---|---|---|---|---|---|
| | | | | | | RTC (min) | RTC (min) | RTF (° C.) | Tg (° C.) | tensile Strength psi | tensile Modulus kpsi | Elongation % |
| 9269-53 | 31 | 2,300 | 9 | 8,816 | 83.9 | 6.2 | 7 | 91 | 88 | 743 | 230 | 0.4 |
| 9269-62 | 27 | 4,050 | 9.5 | 8,274 | 80.5 | NA | NA | NA | 93 | 2,783 | 331 | 0.9 |
| 9269-63 | 29 | | | | | NA | NA | NA | | 1,443 | 149 | 1.1 |
| 9269-58 | 27 | 5,010 | 9.5 | 8,274 | 80.1 | 3.0 | 6.8 | 109 | 87 | 2,364 | 212 | 1.5 |
| 9569-53B | 22 | 3,744 | 10 | 12,546 | 85.9 | NA | NA | NA | 100 | 2,007 | 337 | 0.7 |
| 9269-62B | 17 | 5,190 | NA | Na | 85.21 | NA | NA | NA | 112 | 2,393 | 392 | 0.8 |

While several embodiments of the invention have been shown and described herein, it will be understood that such embodiments are provided by way of example only. Numerous variations, changes and substitutions will occur to those skilled in the art without departing from the spirit of the invention. Rather, the present disclosure is to cover all modifications, equivalents, and alternatives falling within the scope of the present disclosure as defined by the following appended claims and their legal equivalents. Accordingly, it is intended that the description and appended claims cover all such variations as fall within the spirit and scope of the invention.

The contents of all references, patents, pending patent applications and published patents, cited throughout this application are hereby expressly incorporated by reference.

Those skilled in the art will recognize, or be able to ascertain using no more than routine experimentation, many equivalents to the specific embodiments of the invention described herein. Such equivalents are intended to be encompassed by the following claims. It is understood that the detailed examples and embodiments described herein are given by way of example for illustrative purposes only, and are in no way considered to be limiting to the invention. Various modifications or changes in light thereof will be suggested to persons skilled in the art and are included within the spirit and purview of this application and are considered within the scope of the appended claims. For example, the relative quantities of the ingredients can be varied to optimize the desired effects, additional ingredients can be added, and/or similar ingredients can be substituted for one or more of the ingredients described. Additional advantageous features and functionalities associated with the systems, methods, and processes of the present invention will be apparent from the appended claims. Moreover, those skilled in the art will recognize, or be able to ascertain using no more than routine experimentation, many equivalents to the specific embodiments of the invention described herein. Such equivalents are intended to be encompassed by the following claims.

What is claimed is:

1. A curable compound comprising a reaction product of:
   a mixture of (i) a rosin acid or derivative thereof and (ii) a fatty acid or derivative thereof, wherein the mixture comprises (a) about 20 wt % to about 70 wt % of the rosin acid or derivative thereof and (b) about 20 wt % to about 70 wt % of the fatty acid or derivative thereof;
   a glycidyl ether component comprising at least two glycidyl ether groups;
   an $\alpha,\beta$-unsaturated carboxylic acid; and
   a catalyst,
   wherein the curable compound has at least one terminal functional group comprising (meth)acrylate.

2. The curable compound of claim 1, further comprising a diisocyanate compound.

3. A curable composition comprising:
   at least one of the curable compound of claim 1;
   a second curable compound comprising a reaction product of a rosin acid or derivative thereof, a fatty acid or a derivative thereof, or a combination thereof, a glycidyl ester of an $\alpha, \beta$-unsaturated acid, and a catalyst, wherein the second curable compound has at least one terminal functional group comprising (meth)acrylate;
   a curable resin;
   a catalyst; and
   a free radical curing initiator.

4. The curable composition of claim 3, wherein the curable resin comprises a reaction product of a glycidyl ether component comprising a bisphenol epoxy resin, a novolac epoxy resin, a diglycidyl ether, triglycidyl ether, tetraglycidyl ether, or a combination thereof, and an α,β-unsaturated carboxylic acid, wherein the curable resin has at least one terminal functional group comprising (meth)acrylate.

5. The curable compound of claim 2, wherein the diisocyanate compound comprises a monomeric diisocyanate, an oligomeric diisocyanate, or a combination thereof.

6. The curable composition of claim 3, wherein the glycidyl ether component comprises bisphenol A epoxy resin, bisphenol F epoxy resin, epoxy novolac resin, epoxy phenol novolac, epoxy cresol novolac, or a combination thereof.

7. The curable composition of claim 3, wherein the glycidyl ether component comprises a diglycidyl ether, a triglycidyl ether, tetraglycidyl ether, or a combination thereof.

8. The curable composition of claim 3, wherein the glycidyl ether component comprises a diglycidyl ether of neopentyl glycol, a diglycidyl ether of 1,4-butanediol, diglycidyl ether of resorcinol, trimethylolpropane triglycidyl ether; pentaerythritol tetraglycidyl ether, or a combination thereof.

9. The curable composition of claim 3, wherein the rosin acid derivative comprises a disproportionated rosin, a maleated rosin, a fumarated rosin, an acrylonitrile adduct, itaconic acid adduct, an acrylic acid adduct, a dimer acid, an oxidized rosin, a hydrogenated rosin, or a combination thereof.

10. The curable composition of claim 3, wherein the fatty acid derivative comprises a maleated fatty acid, an acrylonitrile fatty acid adduct, a fumarated fatty acid adduct, acrylic-acid fatty acid adduct, an itaconic acid fatty acid adduct, a dimer fatty acid, an oxidized fatty acid, a hydrogenated rosin acid, or a combination thereof.

11. The curable composition of claim 3, wherein the rosin acid or derivative thereof, the fatty acid or derivative thereof, or the combination thereof, each are derived from tall oil fatty acids (TOFA), tall oil rosin (TOR), distilled tall oil (DTO), gum tree rosin, wood rosin, softwood rosin, hardwood rosin, a natural oil, or a combination thereof.

12. The curable composition of claim 11, wherein the natural oil comprises vegetable oil, safflower oil, sesame oil, canola oil, olive oil, oil, coconut oil, soybean oil, linseed oil, castor oil, corn oil, sunflower oil, cottonseed oil, palm-based oils, rapeseed oil, tung oil, peanut oil, jatropha oil, or a combination thereof.

13. The curable composition of claim 3, wherein:
the second curable compound comprises a reaction product of
a rosin acid or derivative thereof, a fatty acid or a derivative thereof, or a combination thereof, glycidyl (meth)acrylate, and
a catalyst; and
the curable resin comprises a reaction product of bisphenol A epoxy resin, (meth)acrylic acid, and a catalyst.

14. The curable composition of claim 3, wherein:
the curable compound comprises a reaction product of
a mixture of (i) a rosin acid or derivative thereof and (ii) a fatty acid or derivative thereof;
bisphenol A epoxy resin;
(meth)acrylic acid; and
a catalyst;
the curable resin comprises a reaction product of bisphenol A epoxy resin, (meth)acrylic acid, and a catalyst.

15. The curable composition of claim 3, wherein:
the curable compound is a reaction product of
a mixture of (i) a rosin acid or derivative thereof and (ii) a fatty acid or a derivative thereof,
bisphenol A epoxy resin,
(meth)acrylic acid, and
a catalyst;
the second curable compound comprises a reaction product of
a rosin acid or derivative thereof, a fatty acid or a derivative thereof, or a combination thereof,
glycidyl (meth)acrylate, and
a catalyst; and
the curable resin comprises a reaction product from bisphenol A epoxy resin, (meth)acrylic acid, and a catalyst.

16. The curable composition of claim 3, wherein the curable compound further comprises an epoxy novolac resin.

17. The curable composition of claim 3, wherein the curable compound further comprises a diisocyanate compound; the second curable compound further comprises a diisocyanate compound; or a combination thereof.

18. The curable composition of claim 3, wherein
the rosin acid or derivative thereof, the fatty acid or derivative thereof, or the combination thereof, each are derived from tall oil fatty acids (TOFA), tall oil rosin (TOR), distilled tall oil (DTO), gum tree rosin, wood rosin, softwood rosin, hardwood rosin, a natural oil, or a combination thereof; and
the tall oil fatty acids (TOFA), tall oil rosin (TOR), distilled tall oil (DTO), gum tree rosin, wood rosin, softwood rosin, hardwood rosin, or natural oil has a rosin acid content from about 25 wt % to about 75 wt %, each based on the sum of amounts of the tall oil fatty acids (TOFA), tall oil rosin (TOR), distilled tall oil (DTO), gum tree rosin, wood rosin, softwood rosin, hardwood rosin, or natural oil.

19. The curable composition of claim 17, wherein the diisocyanate compound comprises a monomeric diisocyanate, an oligomeric diisocyanate, or a combination thereof.

20. A thermoset comprising the curable composition of claim 3, wherein the thermoset has a glass transition temperature ranging from 70 to 120° C. as determined using dynamic mechanical analysis.

21. The curable compound of claim 1, wherein:
the rosin acid derivative comprises a disproportionated rosin, a maleated rosin, a fumarated rosin, an acrylonitrile adduct, itaconic acid adduct, an acrylic acid adduct, a dimer acid, an oxidized rosin, a hydrogenated rosin, or a combination thereof; and
the fatty acid derivative comprises a maleated fatty acid, an acrylonitrile fatty acid adduct, a fumarated fatty acid adduct, acrylic-acid fatty acid adduct, an itaconic acid fatty acid adduct, a dimer fatty acid, an oxidized fatty acid, or a combination thereof.

* * * * *